(12) United States Patent
Chen et al.

(10) Patent No.: US 7,410,194 B2
(45) Date of Patent: Aug. 12, 2008

(54) COMPUTER ENCLOSURE WITH LOCKING DEVICE

(75) Inventors: Yun-Lung Chen, Tu-Cheng (TW); Yu-Ming Xiao, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 182 days.

(21) Appl. No.: 11/316,762

(22) Filed: Dec. 22, 2005

(65) Prior Publication Data

US 2007/0001559 A1    Jan. 4, 2007

(30) Foreign Application Priority Data

Jul. 2, 2005    (CN) .................. 2005 2 0061139

(51) Int. Cl.
*E05C 1/06*    (2006.01)
(52) U.S. Cl. .................. 292/37; 292/DIG. 37; 361/683
(58) Field of Classification Search .......... 292/DIG. 37, 292/32–34, 37, 170; 361/683
See application file for complete search history.

(56) References Cited

U.S. PATENT DOCUMENTS 2,905,493 A * 9/1959 Tocchetto .................. 292/37
3,919,866 A * 11/1975 Lipschutz ..................... 70/81
6,296,334 B1 * 10/2001 Liao ....................... 312/223.2
6,471,263 B1 * 10/2002 Choo ...................... 292/336.3
6,575,503 B1 * 6/2003 Johansson et al. ........... 292/170
6,699,243 B2 * 3/2004 West et al. .................... 606/41
6,926,315 B2 * 8/2005 Kondratuk .................. 292/165
7,152,443 B2 * 12/2006 Chang et al. ................. 70/352
2004/0075282 A1 * 4/2004 Silverman et al. ............. 292/91
2005/0286217 A1 * 12/2005 Bang ......................... 361/683

* cited by examiner

*Primary Examiner*—Gary Estremsky
(74) *Attorney, Agent, or Firm*—Morris Manning Martin LLP; Tim Tingkang Xia, Esq.

(57) ABSTRACT

A computer enclosure includes a chassis (10), a side panel (20), and a locking device (30). The side panel defines a securing hole (24). The locking device is attached to the chassis for locking the side panel to the chassis. The locking device includes a sliding member (50/60), a resilient member (80), and a driving member (40). The sliding member includes a cuneiform portion (52/62) and a protrusion (54/64). The protrusion is engaged in the securing hole of the side panel. The resilient member is used for urging the sliding member. The driving member has a pushing portion (48) corresponding to the cuneiform portion of the sliding member, for disengaging the protrusion of the sliding member from the securing hole of the side panel.

17 Claims, 5 Drawing Sheets

COMPUTER ENCLOSURE WITH LOCKING DEVICE

BACKGROUND OF THE INVENTION

1. Field of the Invention

The present invention relates to computer enclosures, and more particularly to a computer enclosure with a locking device for convenient attachment and removal of a side panel.

2. General Background

A conventional computer enclosure includes a chassis, and a side panel. The side panel is usually secured to the chassis with screws.

Another kind of computer enclosure is provided with a latch mechanism for assembling a housing on the chassis. The computer housing has a front panel, a side panel, and the chassis. A mechanism for latching and releasing the side panel from the chassis includes an opening defined in a side of the front panel, a latch member, a spring, and a locking hole defined in the chassis. The latch member has an arm extending towards the chassis terminating in a hooked portion to engage in the locking hole. The latch member and the spring are received in the opening and are movable between a locked position, where the arm is locked in the locking hole, and a released position, where the arm is disengaged from the locking hole. The spring urges against the base to retain the latch member in the locked position.

However, the latch is assembled to only one side of the chassis for releasing the side panel. When a pair of latches is assembled to the both sides of the chassis, two hands are needed to release the latches. It is inconvenient to disassemble the side panel from the computer enclosure.

What is needed, therefore, is a computer enclosure having a locking device, which allows the convenient assembly and removal of a side panel to/from the computer chassis.

SUMMARY

A computer enclosure includes a chassis, a side panel, and a locking device. The side panel defines a securing hole. The locking device is attached to the chassis for locking the side panel to the chassis. The locking device includes a sliding member, a resilient member, and a driving member. The sliding member includes a cuneiform portion and a protrusion. The protrusion is engaged in the securing hole of the side panel. The resilient member is used for urging the sliding member. The driving member has a pushing portion corresponding to the cuneiform portion of the sliding member, for disengaging the protrusion of the sliding member from the securing hole of the side panel.

Other advantages and novel features will be drawn from the following detailed description of a preferred embodiment with attached drawings, in which:

DETAILED DESCRIPTION OF PREFERRED EMBODIMENTS

Figure 1:
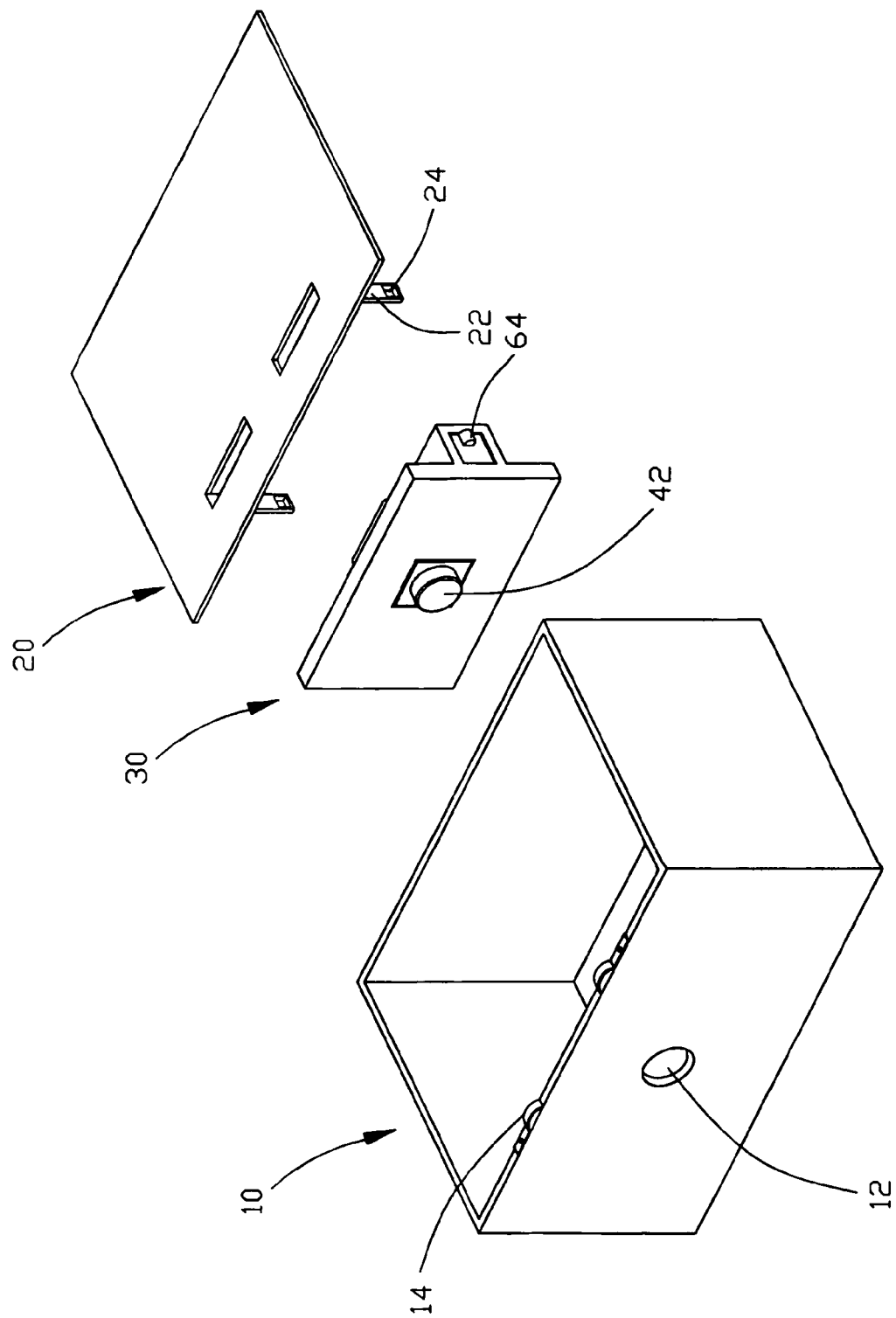
FIG. 1 is an exploded, isometric view of a computer enclosure of a preferred embodiment of the present invention, the computer enclosure including a chassis, a side panel, and a locking device.

Referring to FIG. 1, an enclosure of an electronic device like a computer includes a chassis 10, a side panel 20, and a locking device 30.

A through hole 12 is defined in the chassis 10. A pair of resilient clips 14 is formed on a top edge of the chassis 10. A pair of standing clips 22 is bent down from the side panel 20. A securing hole 24 is defined in a distal end of each standing clip 22.

Figure 2:
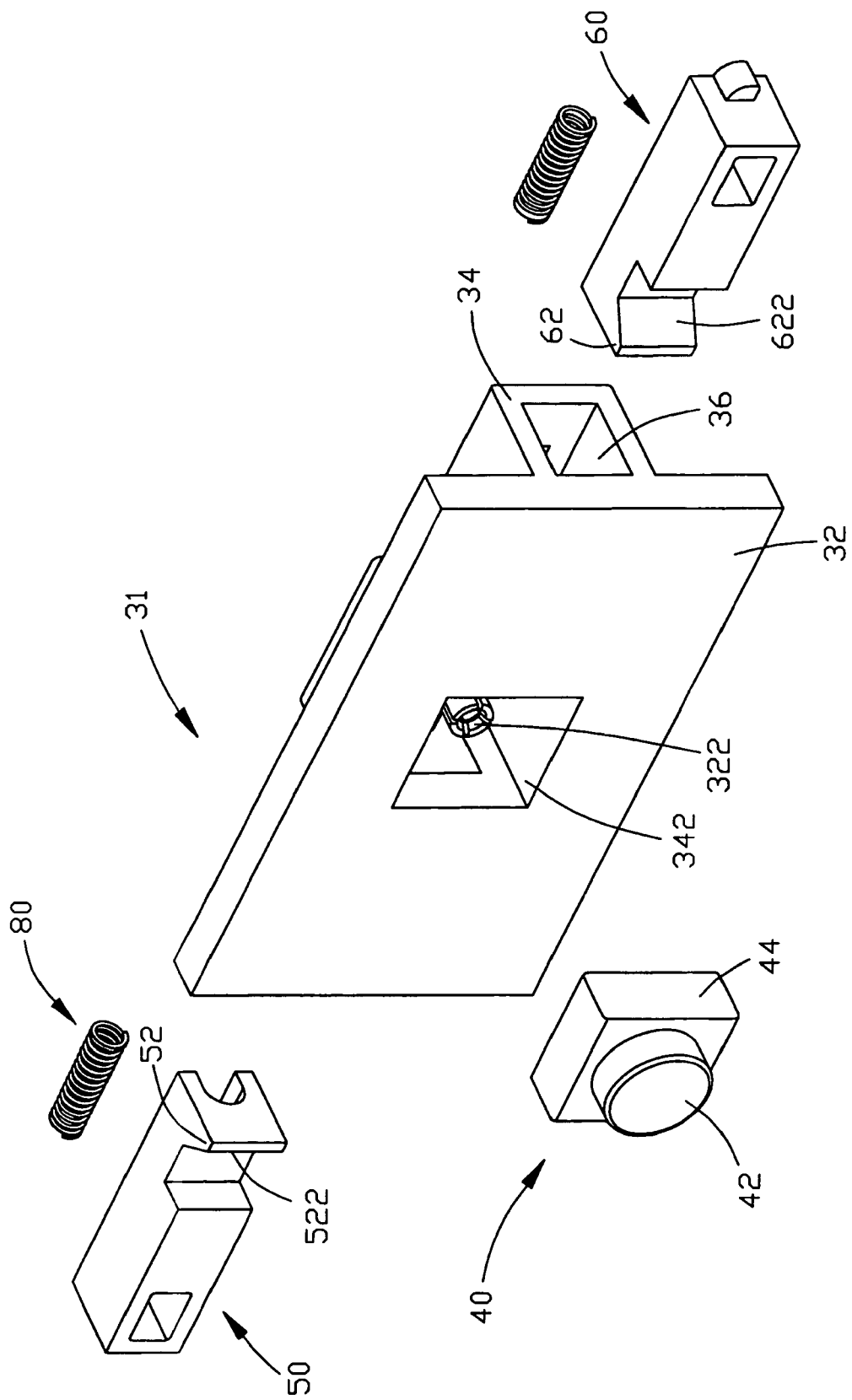
FIG. 2 is an exploded, enlarged, isometric view of the locking device of FIG. 1, the locking device including a body, a driving member, a pair of sliding members, and a pair of springs.
Figure 3:
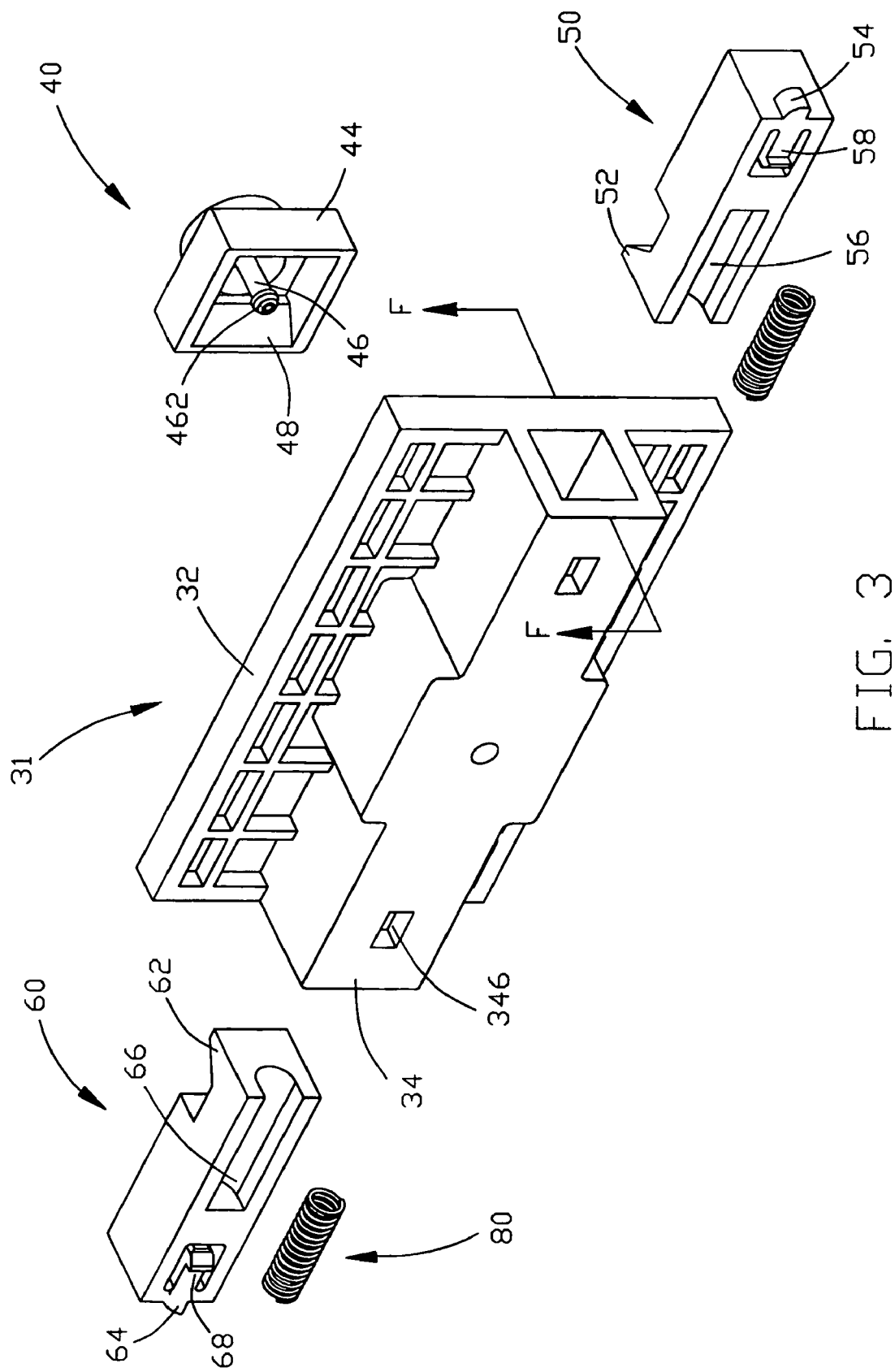
FIG. 3 is similar to FIG. 2, but viewed from another aspect.
Figure 4:
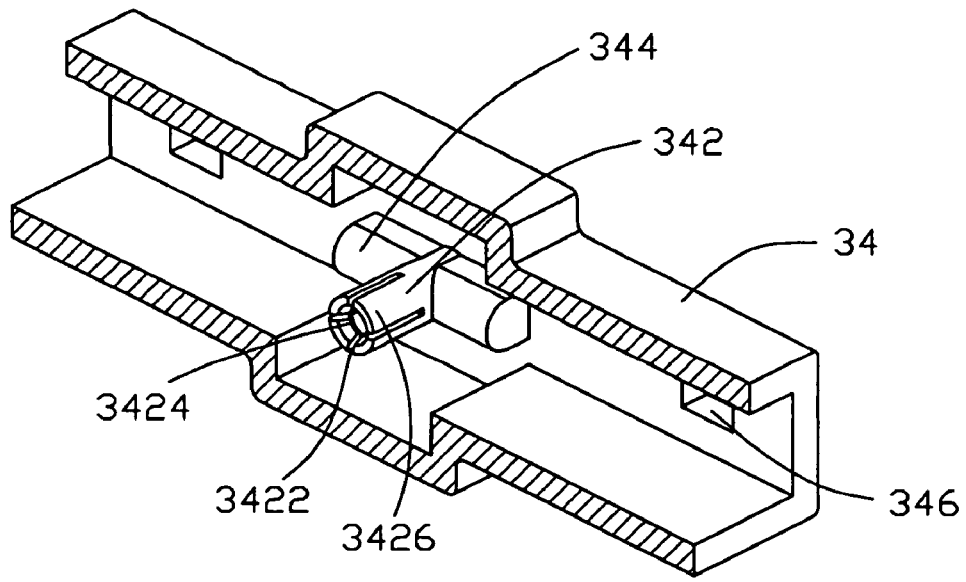
FIG. 4 is a cutaway view of the locking device of FIG. 2.

Referring also to FIGS. 2 to 4, the locking device includes a body 31, a driving member 40, a pair of sliding members 50, 60 and a pair of resilient members, such as springs 80.

The body 31 includes a front panel 32, and a holding wall 34 extending from the front panel 32. A square-shaped through opening 322 is defined in the central portion of the front panel 32, for holding the driving member 40. A sliding way 36 is formed in the holding wall 34, for receiving the sliding members 50, 60. A columniform sheath 342 protrudes from the holding wall 34 in the through opening 322 of the front panel 32. A holding flange 3424 extends inward from an edge of the sheath 342. An X-shaped split 3422 is defined in the sheath 342 thereby dividing the end of the sheath 342 into four resilient portions 3426. A pair of columniform blocks 344 is formed at opposite sides of the sheath 342. A pair of locking holes 346 is defined in a back portion of the holding wall 34.

The driving member 40 includes a button 42 and a frame 44. The button 42 protrudes from the frame 44 and corresponds to the through hole 12 of the chassis 10. A post 46 extends from a back portion of the button 42 corresponding to the sheath 342 of the body 31. A head 462 is formed at a top portion of the post 46 for securing with the holding flange 3424. The frame 44 is slidingly received in the through hole 322 of the body 31. A pair of slanting pushing portions 48 is formed in the frame 44.

The sliding members 50, 60 are cuboid-shaped. A pair of cuneiform portions 52, 62 is respectively formed on the sliding members 50, 60 corresponding to the pushing portions 48 in the frame 44 of the driving member 40. Two contacting surfaces 522, 622 are respectively formed in the cuneiform portions 52, 62. A pair of wedge-shaped protrusions 54, 64 respectively protrudes from each end of the sliding members 50, 60 corresponding to the securing holes 22 of the side panel 20. A pair of channels 56, 66 is defined in a back portion of the sliding members 50, 60 for holding the springs 80. A pair of resilient hooks 58, 68 is formed on a back end of the sliding members 50, 60 corresponding to the locking holes 346 of the body 31.

Figure 5:
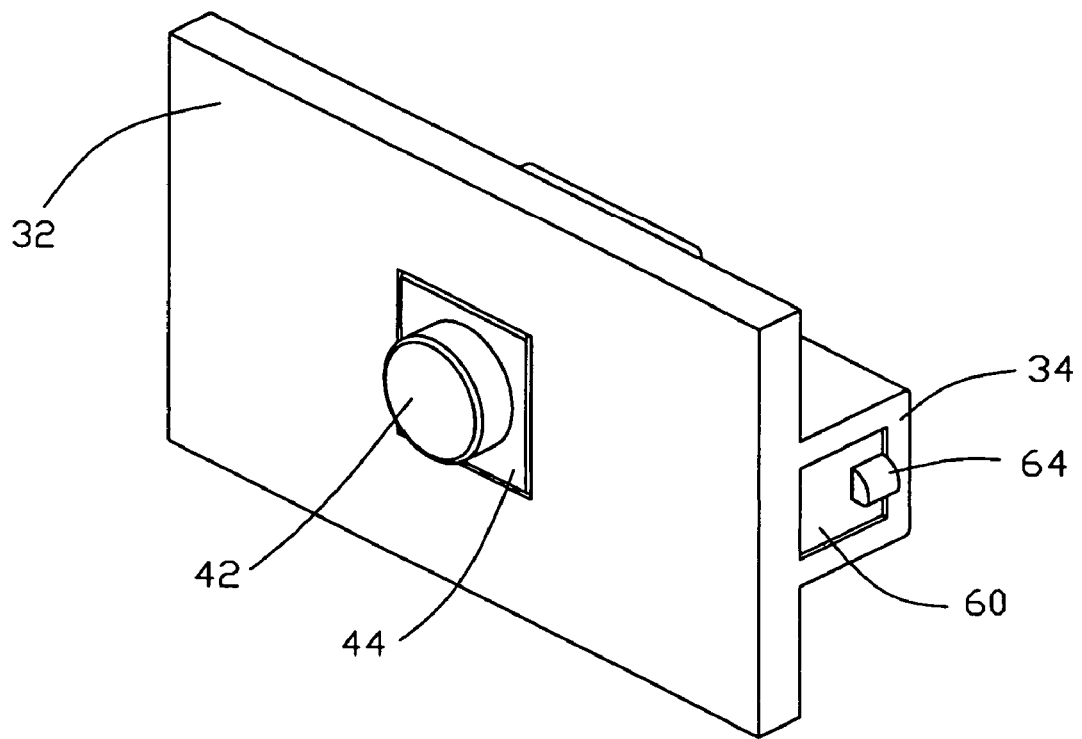
FIG. 5 is an assembled, isometric view of the locking device of FIG. 2.

Referring also to FIG. 5, in assembling the locking device 30, the springs 80 are respectively put into the channels 56, 66 of the sliding members 50, 60. Then the pair of sliding members 50, 60 is respectively slid into the sliding way 36 from both sides thereof until the hooks 58, 68 of the sliding members 50, 60 are engaged into the locking holes 346 of the body 31, the sliding members 50, 60 are thereby secured into the body 31. The post 46 of the driving member 40 is engaged into the sheath 342 of the body 31. The head 462 is blocked by the holding flange 3424 of the sheath 342. The frame 44 of the driving member 40 is secured into the through opening 322 of the body 31. The pushing portions 48 of the driving member 40 are in contact with the contacting surfaces 522, 622 of the sliding members 50, 60.

Figure 6:
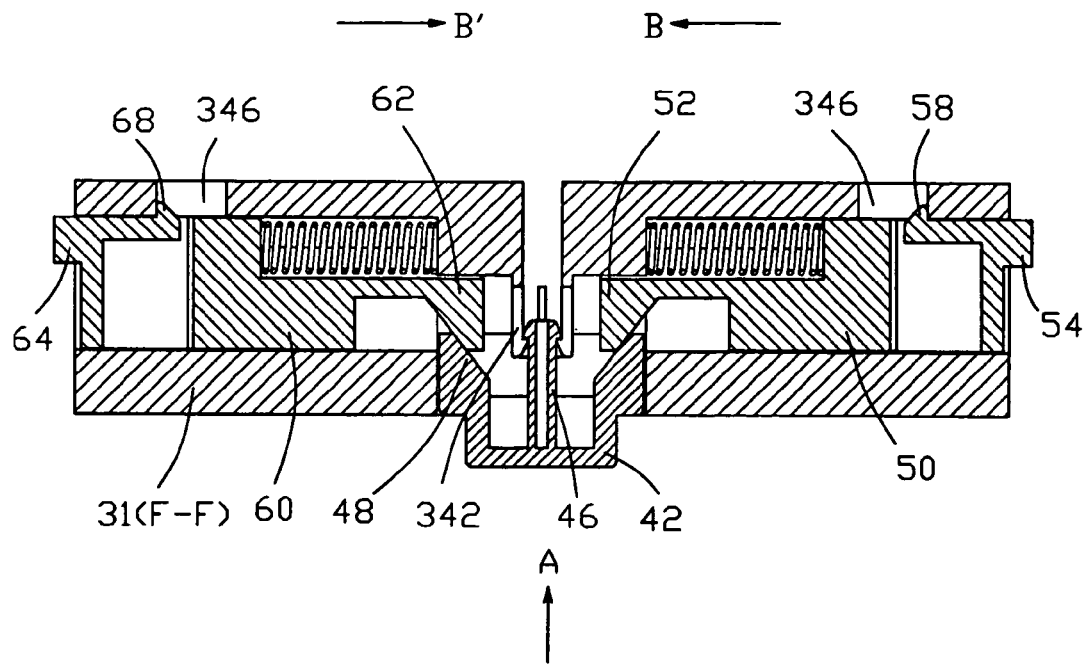
FIG. 6 is a top, cutaway view of the body and the driving member taken along line F-F of FIG. 3 showing the sliding members and the springs assembled in the body, and showing the locking device in a unlocked position.
Figure 7:
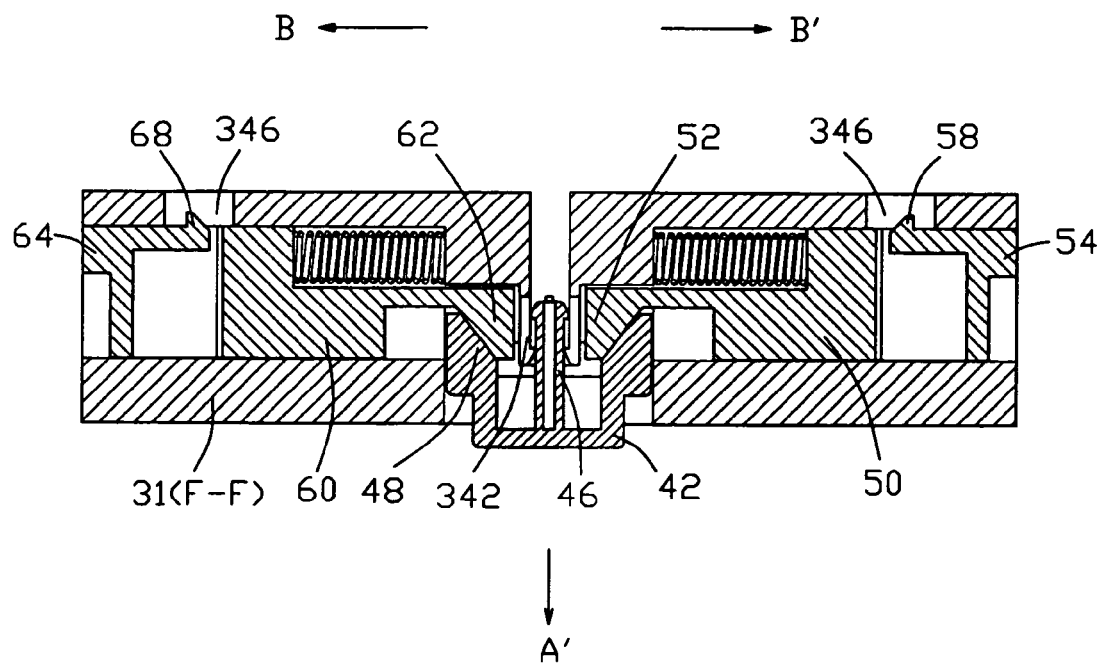
FIG. 7 is similar to FIG. 6, but showing the locking device in a locked position.

Referring also to FIGS. 6 and 7, in assembling the side panel 20 to the chassis 10, the button 32 of the locking device 30 protrudes from the through hole 12 of the chassis 10. The locking device 30 is secured to the chassis 10. The side panel 20 is positioned on top of the chassis 10. The standing clips 22 are pushed down to the chassis 10 toward the protrusions 54, 64 of the sliding members 50, 60. The distal ends of the standing clips 22 abut the protrusions 54, 64 of the sliding members 50, 60 respectively, thereby the sliding members 50, 60 are pushed inward to slide in the sliding way 36 of the body 31 along direction B and B' respectively. The springs 80 in the channels 56, 66 of the sliding members 50, 60 are compressed. When the protrusions 54, 64 of the locking device 30 are engaged in the securing holes 24 of the side panel 20, the sliding members 50, 60 slide back along direction B' and B respectively due to rebounding of the springs 80, until the sliding members 50, 60 are stopped by way of the resilient hooks 58, 68 of the sliding members 50, 60 engaging in the locking holes 346 of the body 31. Then the protrusions 54, 64 of the sliding members 50, 60 engage in corresponding securing holes 24 of the side panel 20, thereby securing the side panel 20 to the chassis 10.

In disassembling the side panel 20 from the chassis 10, the button 32 of the locking device 30 is pushed in along direction A. The pushing portions 48 of the driving member 40 abut the cuneiform portions 52, 62 of the sliding members 50, 60. The cuneiform portions 52, 62 of the sliding members 50, 60 are pushed in, thereby the sliding members 50, 60 slide in the sliding way 36 of the body 31 along direction B and B' respectively. When the protrusions 54, 64 of the sliding members 50, 60 are disengaged from the corresponding securing holes 24 of the side panel 20, the side panel 20 is pushed up by the resilient clips 14 of the chassis 10, and the side panel 20 is thereby disengaged from the chassis 10. When the button 32 of the driving member 30 is released, the sliding members 50, 60 slide back along direction B' and B respectively due to rebounding of the springs 80. The pushing portions 52, 62 of the driving member 40 are pushed back along direction A' by the cuneiform portions 52, 62 of the sliding member 50.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure, comprising:
   a chassis;
   a side panel defining a securing hole; and
   a locking device attached to the chassis for locking the side panel onto the chassis, the locking device comprising:
   a body;
   a sliding member received in the body, and comprising a cuneiform portion and a protrusion, the protrusion engaging in the securing hole of the side panel;
   a resilient member for urging the sliding member into an original position; and
   a driving member having a pushing portion corresponding to the cuneiform portion of the sliding member, for disengaging the protrusion of the sliding member from the securing hole of the side panel, wherein a sheath protrudes from the body, a post protrudes from the driving member corresponding to the sheath, and the post is received by the sheath and slidable therein, wherein a holding flange is extended inward from an edge of the sheath, and a head is formed on an end portion of the post, and the head can be stopped by the flange of the sheath.

2. The computer enclosure as described in claim 1, wherein the sliding member is cuboid-shaped, and the cuneiform portion and the protrusion are respectively positioned on ends of the sliding member.

3. The computer enclosure as described in claim 1, wherein a resilient hook is formed on the sliding member for restricting the range of movement of the sliding member, and a locking hole is defined in the body corresponding to the resilient hook.

4. The computer enclosure as described in claim 1, wherein a channel is formed in the sliding member for holding the resilient member, and a block protrudes from the body corresponding to the resilient member.

5. The computer enclosure as described in claim 1, wherein the body comprises a front panel, and a holding wall extends from the front panel, and a sliding way is formed in the holding wall for slidingly receiving the sliding member.

6. The computer enclosure as described in claim 1, wherein a standing clip is formed on the side panel, and the standing clip defines the securing hole therein.

7. A computer enclosure, comprising:
   a chassis;
   a side panel; and
   a locking device attached to the chassis for locking the side panel onto the chassis, the locking device comprising:
   a body defining a sliding way in a first direction;
   a pair of sliding members engaged with the side panel, the pair of sliding members being slideably received in the body;
   a resilient member positioned in the body for urging each sliding member to return to an original position, wherein a channel is formed in the each sliding member for holding the resilient member, and a block protrudes from the body corresponding to each resilient member; and
   a driving member, a pushing portion formed on the driving member corresponding to the pair of the sliding members, wherein when the driving member is pushed in a second direction, the pushing portion urges the two sliding members to slide along the sliding way oppositely and disengage from the side panel.

8. The computer enclosure as described in claim 7, wherein the each sliding member comprises a cuneiform portion and a protrusion, and the cuneiform portion and the protrusion are respectively positioned on either end of the each sliding member.

9. The computer enclosure as described in claim 7, wherein a resilient hook is formed on the each sliding member for restricting the range of motion of the sliding member, and a locking hole is defined in the body corresponding to the resilient hook.

10. The computer enclosure as described in claim 7, wherein the first direction is perpendicular to the second direction.

11. The computer enclosure as described in claim 7, wherein the body comprises a front panel, and a holding wall extends from the front panel, and the sliding way is formed in the body.

12. The computer enclosure as described in claim 11, wherein a sheath protrudes from the holding wall of the body, a post protrudes from the driving member corresponding to the sheath, and the post can engage into the sheath and slide therein.

13. The computer enclosure as described in claim 12, wherein a holding flange extends inward from an edge of the sheath, a head is formed on an end portion of the post, and the head can be stopped by the flange of the sheath.

14. An electronic device comprising:
- a chassis of said electronic device providing inner space therein for installation of components of said electronic device;
- a side panel removably attachable to a side of said chassis so as to enclose said inner space together with said chassis;
- a locking device installable to one of said chassis and said panel, said locking device comprising a body and a pair of sliding members received in said body, at least one protrusion formed in each of said pair of sliding members capable of engaging with the other of said chassis and said panel along a first direction to secure said panel onto said chassis, wherein a sheath protrudes from said body of said locking device, a post protrudes from said driving member corresponding to said sheath, and said post engages in said sheath and slide therein; and
- a driving member held in said body, and movable along a second direction different from said first direction so as to controllably urge each of said at least one protrusion to be restorably movable for disabling engagement thereof with said other of said chassis and said panel.

15. The electronic device as described in claim 14, wherein said first direction and said second direction are parallel to said attached panel to said chassis and perpendicular to each other.

16. The electronic device as described in claim 14, wherein restoration of said engagement of said at least two protrusions with said other of said chassis and said panel is capable of urging movement of said driving member along a reverse direction to said second direction.

17. The electronic device as described in claim 14, wherein a holding flange extends inward from an edge of said sheath, a head is formed on an end portion of the post, and said head can be stopped by said flange of said sheath.

* * * * *